United States Patent [19]

Biornard

[11] Patent Number: 5,091,244
[45] Date of Patent: Feb. 25, 1992

[54] ELECTRICALLY-CONDUCTIVE, LIGHT-ATTENUATING ANTIREFLECTION COATING

[75] Inventor: Erik J. Biornard, Northfield, Minn.

[73] Assignee: Viratec Thin Films, Inc., Faribault, Minn.

[21] Appl. No.: 566,052

[22] Filed: Aug. 10, 1990

[51] Int. Cl.$^5$ .............................................. C03C 17/34
[52] U.S. Cl. ...................................... 428/216; 428/213; 428/426; 428/432; 428/698; 428/701; 428/704; 359/359; 359/586; 359/589; 359/885
[58] Field of Search ............... 428/336, 426, 432, 698, 428/701, 213, 216, 704; 350/1.6, 1.7, 164, 166

[56] References Cited

U.S. PATENT DOCUMENTS

| 3,761,160 | 9/1973 | Apfel et al. | 350/164 |
|---|---|---|---|
| 3,829,197 | 8/1974 | Thelen | 350/164 |
| 3,854,796 | 12/1974 | Thelen | 350/164 |
| 3,858,965 | 1/1975 | Sumita | 350/164 |
| 3,885,855 | 5/1975 | Gross | 350/166 |
| 3,922,068 | 11/1975 | Netsuki | 350/166 |
| 4,308,316 | 12/1981 | Gordon | 328/336 |
| 4,387,960 | 6/1983 | Tani | 350/164 |
| 4,422,721 | 12/1983 | Hahn et al. | 350/164 |
| 4,534,841 | 8/1985 | Hartig et al. | 428/426 |
| 4,535,000 | 8/1985 | Gordon | 427/160 |
| 4,628,005 | 12/1986 | Ito et al. | 428/432 |
| 4,690,871 | 9/1987 | Gordon | 428/432 |
| 4,732,454 | 3/1988 | Saito et al. | 350/164 |
| 4,799,745 | 1/1989 | Meyer et al. | 350/1.7 |
| 4,805,989 | 2/1989 | Nakajima | 350/164 |
| 4,847,157 | 7/1989 | Goodman et al. | 428/426 |

FOREIGN PATENT DOCUMENTS

| 3627248 | 4/1987 | Fed. Rep. of Germany . |
|---|---|---|
| 203903-A | 11/1983 | German Democratic Rep. . |
| 204693-A | 12/1983 | German Democratic Rep. . |
| 209176-A | 4/1984 | German Democratic Rep. . |
| 225860-A | 8/1985 | German Democratic Rep. . |
| 1397316 | 6/1975 | United Kingdom . |
| 1406567 | 9/1975 | United Kingdom . |
| 1417779 | 12/1975 | United Kingdom . |

OTHER PUBLICATIONS

"Optical and Electrical Properties of Thin TIN Layers", V. Szczyrbowski et al., Vakuum Technik, vol. 37, pp. 14-19, Jan. 14, 1988.

"Optical Constants of Thin Silver and Titanium Nitride Films", E. Vakonen et al., Inst. of Tech. Uppsala University, Uppsala, Sweden (Proc. SPIE Int. Soc. Opt. Eng. (USA)), vol. 652, pp. 235-242.

"A New Approach to the Design of Metal-Dielectric Thin-Film Antireflection Coatings", H. A. MacLeod (Optica Acta, 1978, vol. 25, No. 2, pp. 93-106).

"Reflectivity of $ScN_x$ Thin Films: Comparison with $TiN_x$, $TiN_xC_y$ and $ZrN_x$ Coatings and Application to the Photothermal Conversion of Solar Energy", Francois, J. C. et al. (Thin Solid Films, 127 (1985), 205-214, Electronics and Optics).

Primary Examiner—Patrick J. Ryan
Assistant Examiner—Archene Turner
Attorney, Agent, or Firm—Heller, Ehrman, White & McAuliffe

[57] ABSTRACT

A coating for an article comprising layers of nitrides of certain transition metals to provide an electrically-conductive, light-attenuating, antireflection surface.

34 Claims, 9 Drawing Sheets

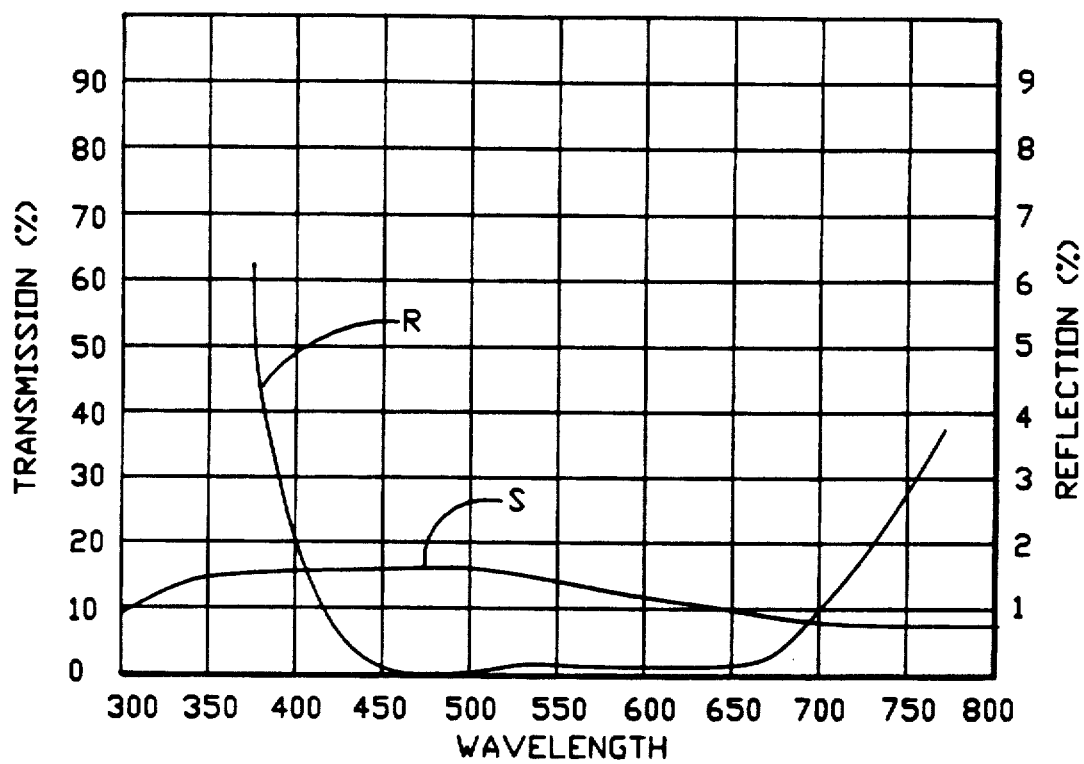
FIG.—10
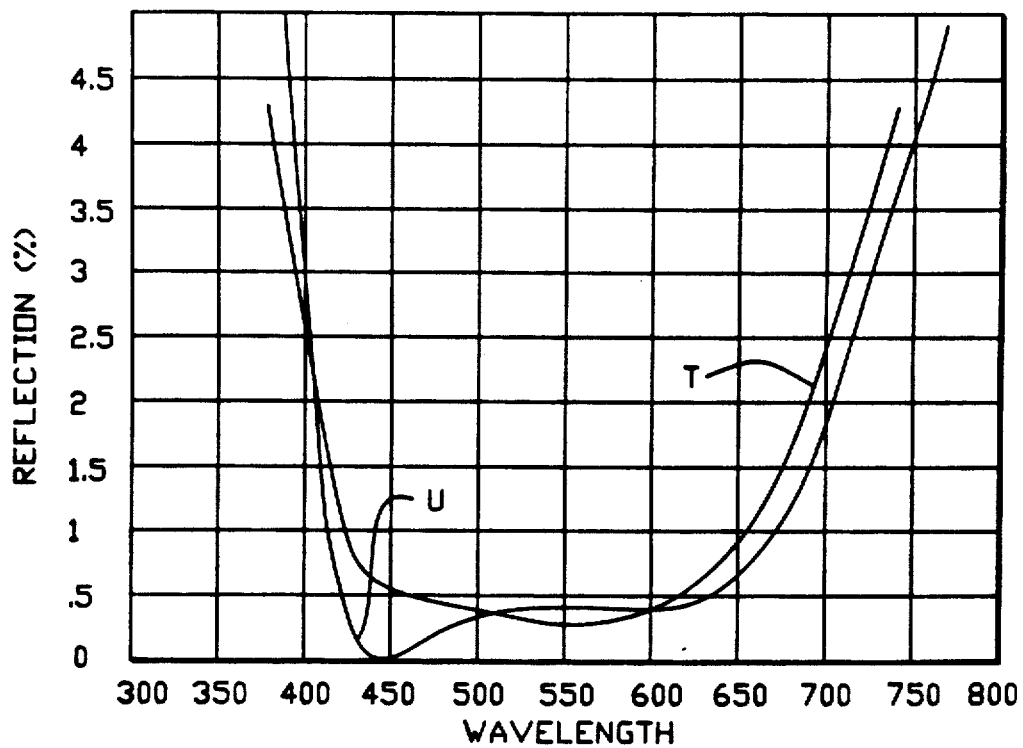
FIG.—11

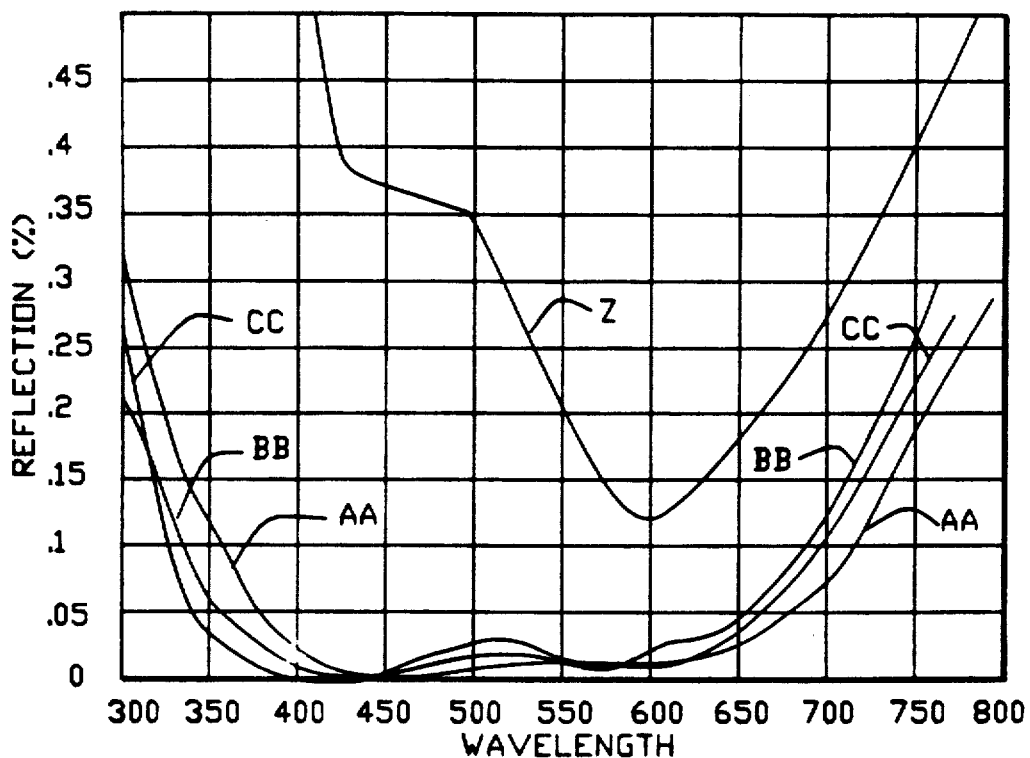
FIG.—15
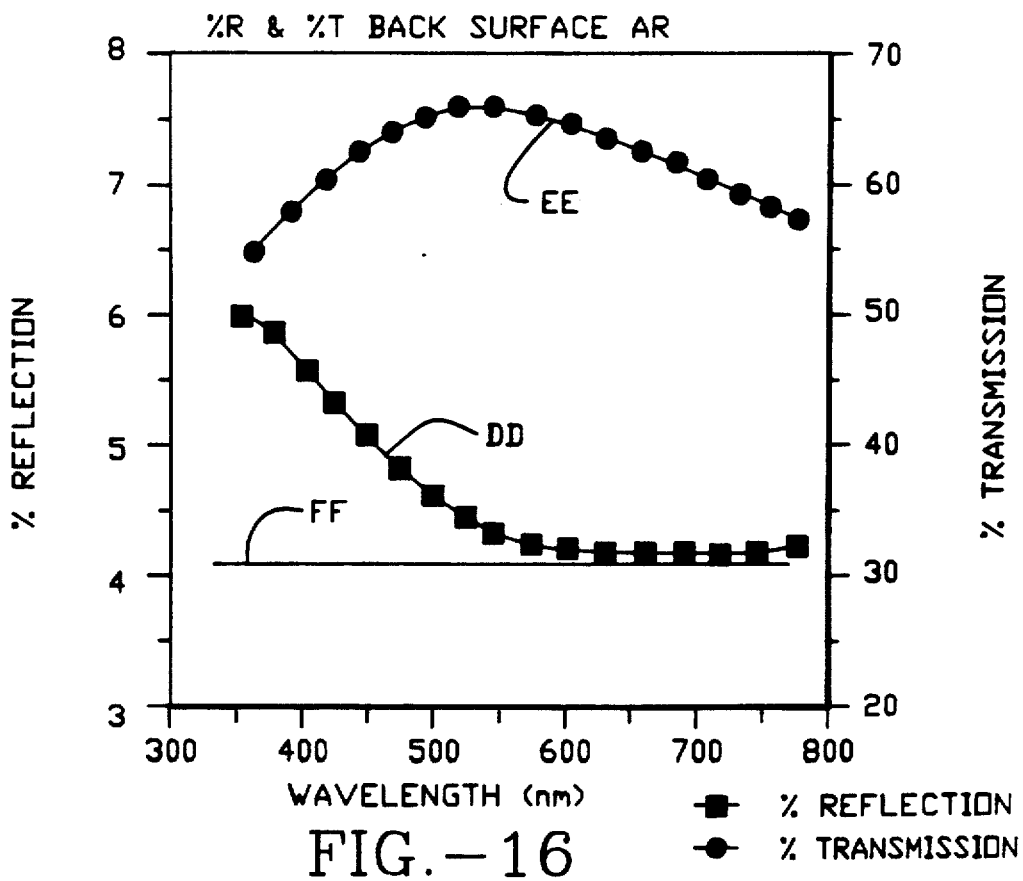
FIG.—16

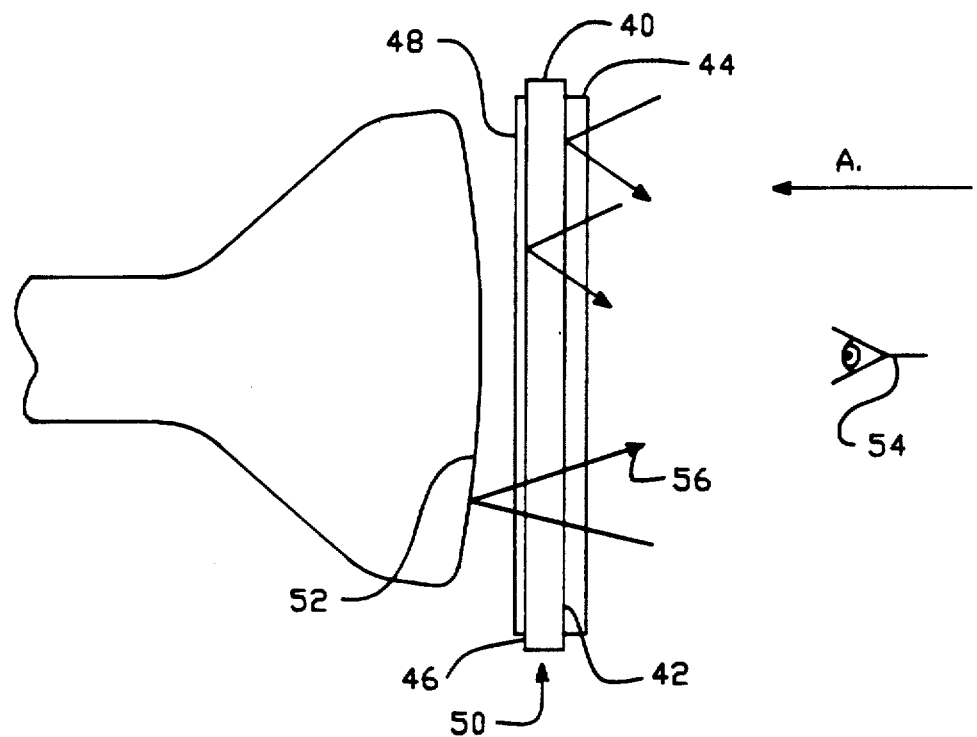
FIG.—17
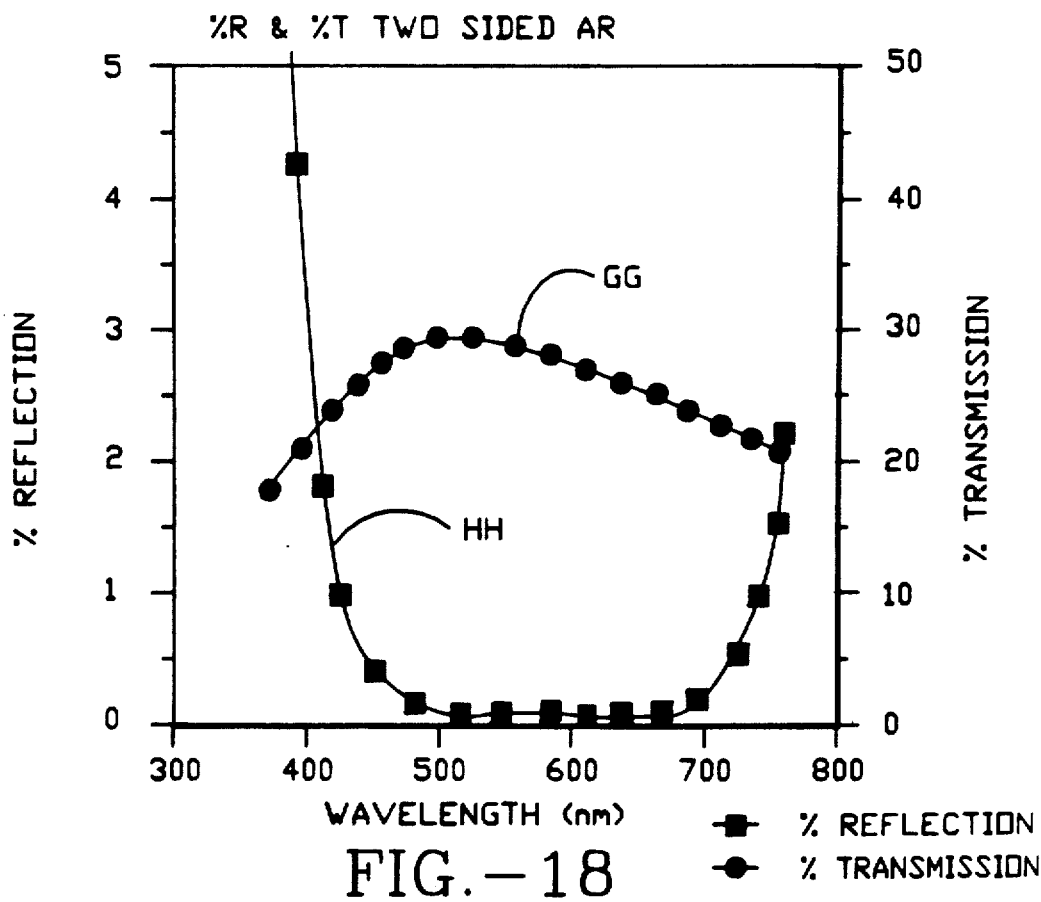
FIG.—18

ELECTRICALLY-CONDUCTIVE, LIGHT-ATTENUATING ANTIREFLECTION COATING

BACKGROUND OF THE INVENTION

The present invention relates to thin film antireflection coatings, and more particularly to an electrically-conductive, antireflection coating which attenuates light.

Certain articles are fabricated to attenuate light for various reasons such as heat reduction, eye protection and an improved visibility. These articles may also require an antireflection coating on at least one surface thereof. Such articles include sunglasses, solar control glazings and contrast enhancement filters.

In sunglasses, light attenuation protects the eye from bright light, and the antireflection coating reduces reflected glare from the surface of the lens facing the eye. Antireflection properties for sunglasses are usually provided by a multilayer coating comprising vacuum-deposited, transparent, dielectric films. The light attenuation feature may be an intrinsic property of the lens. This feature may also be introduced extrinsically by dying the lens. Preferably, sunglasses attenuate about 90 percent of the visible light.

Solar control glazings attenuate solar energy transmitted to the interior of, for example, a vehicle or building. These glazings preferably have a low reflection treatment on their interior surface to reduce distracting reflections. Low emissivity (E) coatings may be used to reduce reflections. Light attenuation for solar control glazings may be achieved by using a light absorbing glass. Light attenuation may also be provided by a vacuum-deposited, metal film or by a plastic sheet coated with a metal film and attached to the glazing by a suitable adhesive. The light attenuation is about 50 percent of the visible light.

A contrast enhancement filter is often used to enhance image contrast and reduce glare from the screen of a video display terminal (VDT). This filter is located between the VDT operator and the screen. Contrast enhancement filters may be made from light absorbing glass. The glass may transmit about 30 percent of incident light. Light from extraneous sources, such as windows and light fixtures, passes through the filter and is attenuated before it is reflected from the screen. After it is reflected from the screen, it must again pass through the filter before it is observed by the operator. After the second pass, light may be attenuated to about 10 percent of the intensity that it would have had without the filter. If reflectivity of the screen is about 4 percent, the images of extraneous light sources and objects may be reduced by more than 99.5 percent.

Light from the screen image passes through the contrast enhancement filter only once. Thus, it may be attenuated only about 70 percent. As such, visibility of the image is enhanced. A contrast enhancement filter is effective only if its outer facing surface is provided with an antireflection treatment. Preferably, both its inner and outer surfaces should be so treated. The antireflection treatment may comprise a multilayer, antireflection coating. Such a coating may have a perceived reflectivity for visible light, usually called the photopic reflection or the photopic reflectivity, less than about 0.25 percent. Filters having a photopic reflectivity of less than about 0.15 percent are preferable.

A contrast enhancement filter may be made from glass or plastic. If the filter is located close to the cathode ray tube (CRT), it may build-up static charges. Thus, one or both surfaces of the filter is preferably electrically-conductive and grounded to prevent the build-up of static charges. If the filter surfaces are provided with a multilayer, antireflection coating, electrical conductivity may be an intrinsic property of the coating. Electrically-conductive, transparent films, such as indium tin oxide, may be used in such coatings.

The cost of an electrically-conductive filter may be as great as about 30 percent of the cost of the VDT. The high cost of these filters can discourage their use.

It is well known that light-absorbing films may be used to construct antireflection layer systems. The simplest light absorbing systems include a low reflectivity metal film, such as chromium or molybdenum, in contact with a glass or plastic substrate, and a layer of a transparent dielectric material, such as magnesium fluoride or silicon dioxide, in contact with the low reflectivity film. These metal films may be very thin, on the order of about 5 nanometers (nm). The optical properties of such thin films are difficult to control as the metals tend to oxidize during the initial part of the deposition process. Subsequent oxidation or corrosion of the coating may also occur. A thin metal film may also provide inadequate electrical conductivity and only about 40 percent attenuation of visible light.

FIG. 1 shows the computed transmission (curve A) and reflection (curve B) values of a two layer system comprising a chromium film about 1.6 nm thick and a silicon dioxide film about 75.4 nm thick. The films are disposed on a glass substrate having a refractive index of about 1.52. The photopic reflection of the system is about 0.35 percent when observed from the side of the system opposite the substrate, i.e. from the air side of the system. The photopic transmission is about 75 percent.

Another antireflection system is a low E coating including a silver film having a high refractive index and bounded on either side by a dielectric film. The lowest reflection is obtained with relatively thin films of silver, for example 6 to 8 nm thick. Attenuation of visible light, however, is negligible.

The silver-dielectric layer system may be extended to include one additional silver film. This may increase the system's electrical conductivity and improve its antireflection performance. The silver films may be separated by a relatively high refractive index dielectric material having an optical thickness of about one-half wavelength at a wavelength of about 510 nm, which is about the middle of the visible spectrum. Each silver film will also be bounded by a layer of dielectric material. Each dielectric layer will have a refractive index of about one-quarter wavelength at a wavelength of about 510 nm.

This system is similar in function to the light-transmitting, heat-reflecting coating described in U.S. Pat. No. 4,799,745. The silver films of this coating must be relatively thin to provide the lowest possible reflection. Attenuation of visible light for this coating is one the order of about 10 percent. Sheet resistance may be about ten ohms per square, providing adequate electrical conductivity for most purposes.

FIG. 2 illustrates the transmission (curve C) and reflection (curve D) values for a system comprising two silver films and three dielectric layers. The system is deposited on a glass substrate. The layer sequence and physical thickness, beginning from the substrate, are as follows: zinc oxide (45.7 nm), silver (6.9 nm), zinc oxide (85.3 nm), silver (18.4 nm), and zinc oxide (43.3 nm). The refractive index of the glass substrate is 1.52.

Systems using combinations of a high light absorbing metal, such as chromium, and a low light absorbing metal, such as silver or gold, may also be constructed. Such combinations permit different values of photopic transmission while still providing relatively low reflection from at least one surface. In general, however, systems including a thin soft metal film, such as silver, gold or copper, have poor scratch resistance. Systems including thin films of silver or copper are also vulnerable to corrosion and may deteriorate within a few months when used on an unprotected surface.

The above-described layer systems may produce any one of the following: (1) high electrical conductivity and low reflection, (2) adequate light attenuation and low reflection, or (3) adequate light attenuation and high electrical conductivity. These systems do not provide a single structure which has high electrical conductivity, low reflection and adequate light attenuation.

As such, it is an object of the present invention to provide an electrically-conductive, antireflection layer system that provides a wide range of attenuation values for visible light, while still providing low photopic reflection.

It is a further object of the present invention to provide a light attenuating, antireflection layer system which may have a sheet resistance less than about 100 ohms per square.

It is yet another object of the present invention to provide an electrically-conductive, light attenuating, antireflection layer system which is abrasion and corrosion resistant.

It is also an object of the present invention to provide a corrosion resistant, abrasion resistant, electrically-conductive, adequate light attenuating, antireflection system which may be deposited by DC reactive sputtering in an in-line coating machine of the type used for architectural glass coating.

Additional objects and advantages of the invention will be set forth in the description which follows, and in part will be obvious from the description or may be learned by practice of the invention. The objects and the advantages of the invention may be realized and obtained by means of the instrumentalities and combination particularly pointed out in the claims.

SUMMARY OF THE INVENTION

The present invention is directed to a coating for an article. The coating comprises a first layer including a material substantially transparent to visible light and having a refractive index between about 1.35 and 1.9. The optical thickness of the first layer is about one-quarter wavelength between about 480 and 560 nanometers. The first layer is the outermost layer of the coating. The coating further includes a second layer substantially including a transition metal nitride having a thickness between about 5 and 40 nanometers. A third layer of the coating includes a material substantially transparent to visible light and having a refractive index between about 1.35 and 2.65. The optical thickness of the third layer is less than or equal to about one-quarter wavelength at a wavelength between about 480 and 560 nanometers. The fourth layer of the coating also substantially includes a transition metal nitride having a thickness between about 5 and 40 nanometers.

The coating may also include a fifth layer of a material substantially transparent to visible light and having a refractive index between 1.35 and 2.65. The optical thickness of the fifth layer is less than or equal to one-quarter wavelength at a wavelength between about 480 and 560 nanometers. This embodiment may also include a sixth layer of a substantially transition metal nitride having a thickness between about 5 and 40 nanometers.

The present invention is also directed to a coating comprising a first layer of a transition metal nitride having a thickness between about 5 and 15 nanometers. A second layer is located adjacent the first layer. The second layer includes a material substantially transparent to visible light and having a refractive index between about 1.35 and 2.65. The thickness of the second layer is between about 2 and 15 nanometers.

The structure of the present invention provides an electrically-conductive, light-attenuating, antireflection coating. The photopic reflection of the structure may be less than about 0.25 percent. The degree of light attenuation provided by the structure may be between about 50 and 90 percent. The electrical sheet resistance of the structure may be about 200 ohms per square or less. The structure is both abrasion and corrosion resistant.

The structure provides high electrical conductivity, low reflection and light attenuation suitable for many applications. The structure of the present invention may be applied on a commercial scale by D.C. reactive sputtering in an in-line coating machine of the type used for architectural glass coating.

DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below serve to explain the principles of the invention.

FIG. 10 graphically illustrates the computed reflection and transmission values, as a function of wavelength, for an embodiment of the present invention using silicon dioxide for the first layer, titanium nitride for the second and fourth layers, and silicon dioxide for the third layer.

FIG. 11 graphically illustrates the computed reflection values, as a function of wavelength, for embodiments of the present invention using aluminum oxide for the first layer, titanium nitride for the second and fourth layers, and thin oxide or titanium dioxide for the third layer.

FIG. 15 graphically illustrates the computed reflection and transmission values of the system of FIG. 14 using a titanium nitride layer with various overcoatings.

FIG. 16 graphically illustrates the measured reflection and transmission values, as a function of wavelength, for a titanium nitride layer.

FIG. 17 schematically illustrates a contrast enhancement filter used in conjunction with a video display screen.

FIG. 18 shows the measured reflection and transmission values, as a function of wavelength, for a contrast enhancement filter coated on one side with a four layer system in accordance with the present invention and coated on the opposite side with a single layer of titanium nitride.

DETAILED DESCRIPTION OF THE PRESENT INVENTION

Figure 1:
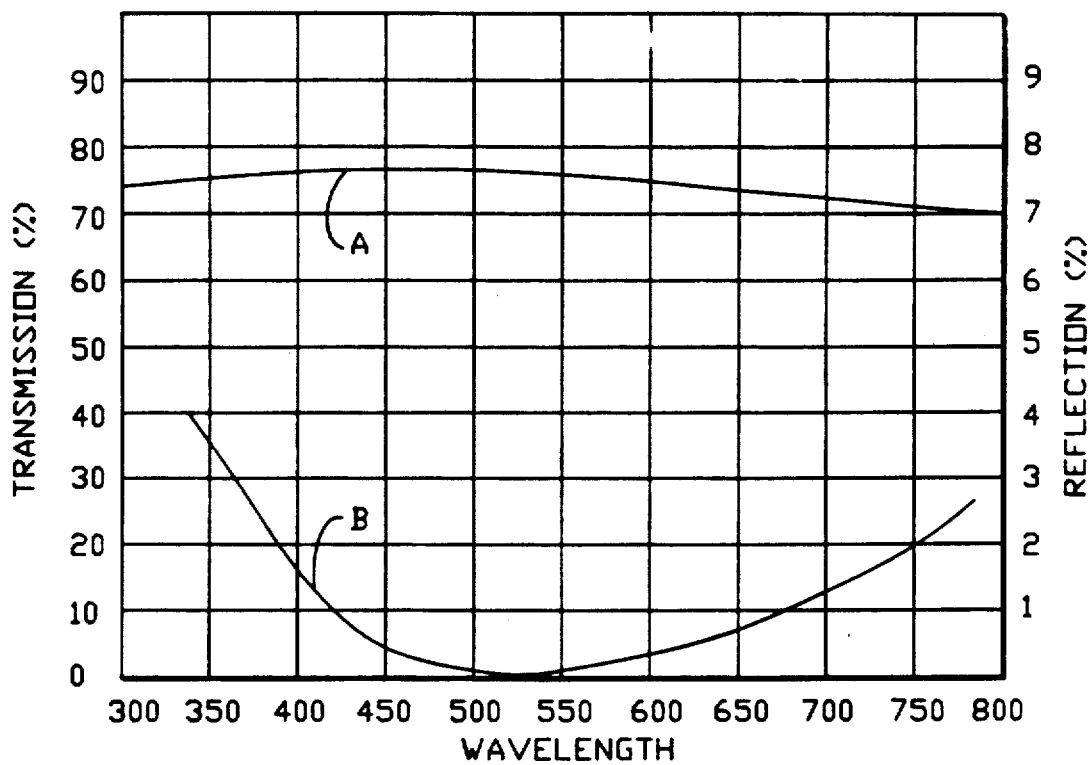
FIG. 1 graphically illustrates the computed reflection and transmission values, as a function of wavelength, of a two layer, light absorbing, antireflection system comprising chromium and silicon dioxide films.
Figure 2:
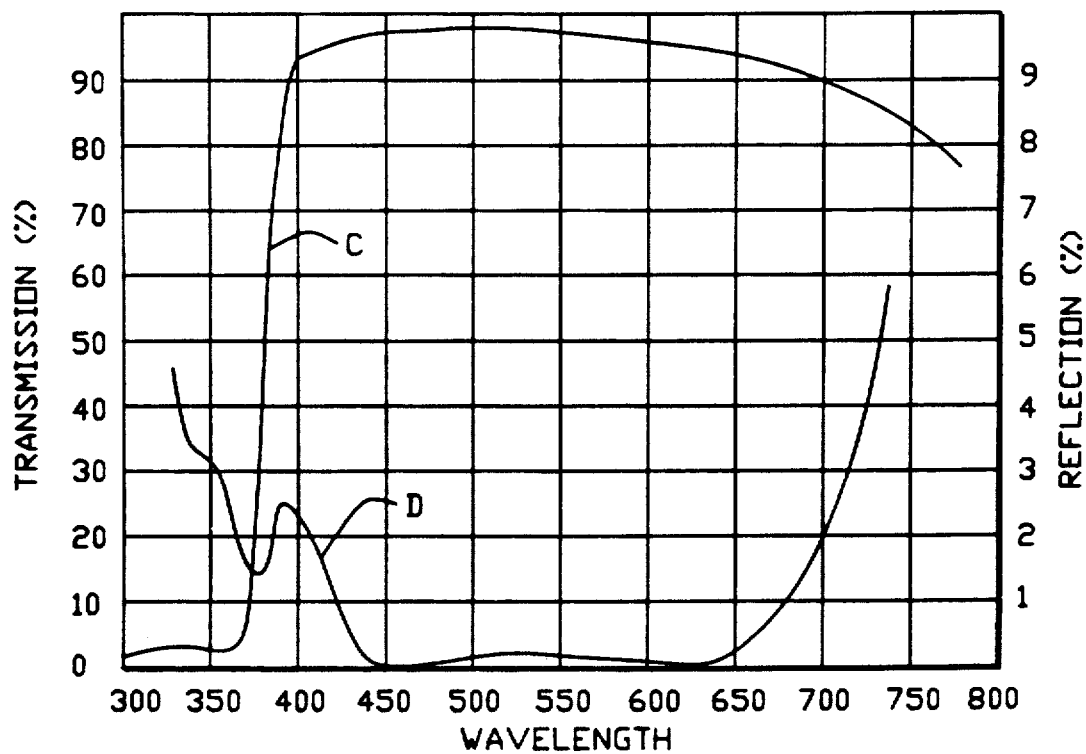
FIG. 2 graphically illustrates the computed reflection and transmission values, as a function of wavelength, of a five layer, light absorbing, antireflection system comprising silver and zinc oxide films.

The present invention uses layers of nitrides of certain transition metals to provide an electrically-conductive, light attenuating, antireflection coating. As such, it provides in one structure or layer system a range of properties which are usually provided by a combination of structures having two of the properties with a substrate having the other.

The transition metals known to form nitrides, and useful in the present invention, include titanium, zirconium, hafnium, vanadium, tantalum, niobium, and chromium. These transition metal nitrides may have optical properties similar to metals, and they are electrically-conductive. In the form of thin films, they may be hard, abrasion resistant and corrosion resistant.

A preferred method of depositing these films is by DC reactive sputtering of the metal in an atmosphere including nitrogen or ammonia. Films may also be deposited by chemical vapor deposition. The properties of the nitride films may be modified by the inclusion of carbon. Such materials are generally referred to as carbonitrides. The carbon may alter the refection color, the conductivity or the morphology of the film. The structure of the present invention includes layers which substantially comprise transition metal nitrides, i.e., for the most part are transition metal nitrides.

The most common of the transition metal nitrides is titanium nitride. Titanium nitride is used extensively as a plating material for watches and jewelry. It is generally referred to as "gold tone" plating. When deposited on a smooth polished surface, it is very difficult to distinguish from gold. Unlike gold, however, it is hard and has a high degree of scratch resistance. It is also resistant to most corrosive agents encountered in everyday use.

The optical properties of nitrides are discussed in the paper "Selective Transmission of Thin TiN Films", Valkonen et al., *Proc SPIE Int. Soc. Opt. Eng.*, Vol. 401, pp. 375-81 (1983), the entire text of which is hereby incorporated by reference.

The optical properties of metals and light absorbing materials are generally specified in terms of the complex refractive index: n-jk. The values of n (the real part of the complex index) and k (the imaginary part of the complex index) are referred to as the optical constants of a material. They may be different for different crystalline and physical forms of a material.

The optical properties of titanium nitride films are dependent on the films' thickness. In the thicknesses useful in the context of the present invention, i.e. about 5 to 40 nm, the optical constants of the transition metal nitrides may not vary by more than about 20 percent. The present invention may be configured to accommodate variations in optical constants by adjusting film thickness.

The optical constants for titanium nitride films and other transition metal nitrides may vary as a function of process parameters such as sputtering gas flow rate, gas mixture proportions, sputtering pressure, and sputtering power. These variations will be greater at wavelengths longer than about 600 nm. For wavelengths less than about 600 nm, variations may fall within a relatively narrow range, for example, within about fifteen percent.

Table 1 shows the optical constants (n, k) for titanium nitride films about 15 and 25 nm thick. These optical constants were determined by reflection and transmission measurements of films of a known thickness. The films were deposited by DC reactive sputtering from a planar magnetron, using a titanium target, in a flowing argon/nitrogen mixture. The sputtering voltage was 420 volts, the sputtering pressure was 3.17 millitorr, the flow rate for the argon was 250 standard cubic centimeters per minute (sccm), and the flow rate for the nitrogen was 220 sccm. The 25 nm thick films were deposited at a line speed of 75 inches per minute. The 15 nm film was deposited at a line speed of 136 inches per minute.

TABLE 1

| Optical Constants of Titanium Nitride | | | | | |
|---|---|---|---|---|---|
| Wavelength (nm) | 15 nm Thick | | Wavelength (nm) | 25 nm Thick | |
| | n | k | | n | k |
| 380 | 1.32 | 1.45 | 380 | 1.32 | 1.45 |
| 430 | 1.45 | 1.45 | 430 | 1.34 | 1.42 |
| 470 | 1.48 | 1.48 | 480 | 1.36 | 1.40 |
| 500 | 1.50 | 1.50 | 520 | 1.40 | 1.48 |

TABLE 1-continued

| Optical Constants of Titanium Nitride | | | | | |
|---|---|---|---|---|---|
| Wavelength (nm) | 15 nm Thick n | k | Wavelength (nm) | 25 nm Thick n | k |
| 550 | 1.65 | 1.57 | 550 | 1.47 | 1.46 |
| 600 | 1.83 | 1.74 | 600 | 1.50 | 1.85 |
| 700 | 1.95 | 2.10 | 700 | 1.79 | 2.37 |
| 800 | 2.20 | 2.50 | 800 | 2.15 | 2.95 |

The optical constants of Table 1 were used in computing the optical properties of the various embodiments of the present invention discussed below. Films of the transition metals may be described as "metal like" with respect to their electrical and reflection properties. The values of the optical constants at wavelengths less than about 600 nm are, however, significantly different from metals.

The difference between the optical properties of titanium nitride and the common metals may be seen by comparing the values n, k of Table 1 with the values n, k for some common metals shown in Table 2.

TABLE 2

| Wavelength (nm) | Metal | n | k |
|---|---|---|---|
| 500 | Silver | 0.2 | 2.9 |
| 500 | Gold | 0.8 | 1.8 |
| 580 | Chromium | 3.0 | 4.8 |
| 500 | Nickel | 1.8 | 3.4 |
| 500 | Molybdenum | 3.1 | 3.0 |
| 500 | Copper | 1.0 | 2.8 |

The formula for computing the reflectivity and transmission of thin metal films is complex. The following "rules of thumb", however, may serve to help in the understanding the present invention.

The reflectivity or brightness of metals in the form of thick opaque films or polished bulk materials is directly proportional to the ratio of k/n, i.e. the higher this ratio, the brighter the metal. The light transmission through thin metal films increases as the value of n decreases, and, to a lesser extent, as the value of k decreases. Silver is highly reflective in the form of relatively thick films and transparent in the form of relatively thin films. Chromium films having a relatively low value of k/n are not highly reflective. Chromium films are also strongly light absorbing.

Titanium nitride films are also very light absorbing. However, the values of n and k for the films are such that they have to be at least about 30 nm in thickness to absorb about 50 percent of visible light. On the other hand, 4 nm thick chromium films may absorb about 50 percent of the visible light. Titanium nitride films, about 25 nm or more thick, will meet the low sheet resistance objectives of the present invention, i.e. about 200 ohms per square or less. As such, they will provide adequate electrical-conductivity to prevent static charge build-up. They will also provide sufficient light attenuation.

Figure 3:
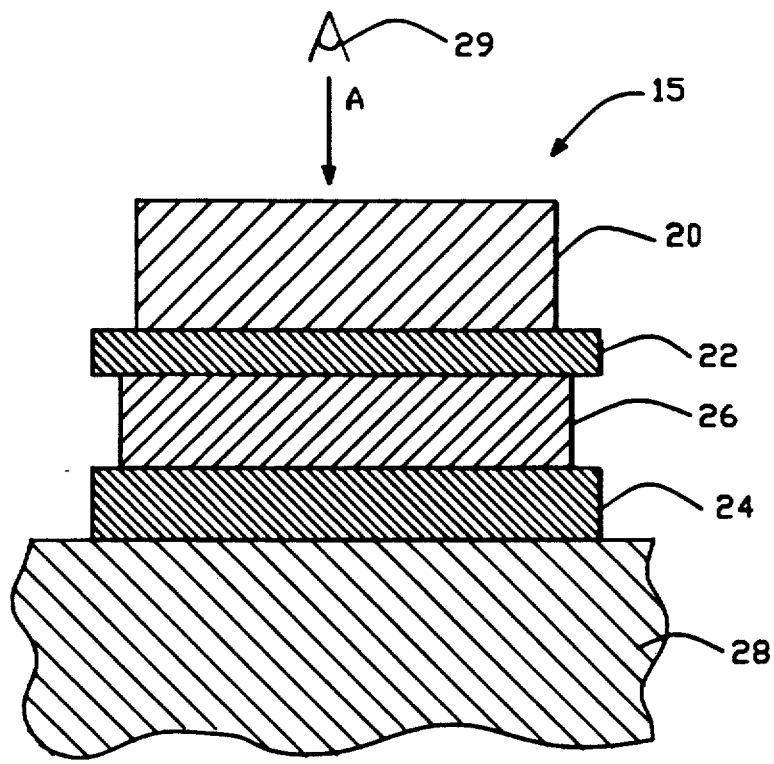
FIG. 3 schematically illustrates a four layer system in accordance with the present invention.

As shown in FIG. 3, a preferred system or structure 15 of the present invention comprises four films 20, 22, 26, and 24 deposited on a glass or plastic substrate 28. The first and outermost film 20 is substantially transparent to visible light and has a refractive index preferably less than about 1.9 at a wavelength of about 510 nm. Its optical thickness is about one-quarter of a wavelength at a wavelength between about 480 nm and 560 nm. Film 26 is also substantially transparent to visible light and has a refractive index in the range from about 1.35 and about 2.65 at a wavelength of about 510 nm. Its optical thickness is less than or equal to about one-quarter wavelength at a wavelength between about 480 and 560 nm. The optical thickness of the film may be less as the refractive index of the film increases.

Layers 22 and 24 are transition metal nitride films each having a physical thickness between about 5 and 40 nm. The exact thickness will depend on the degree of light attenuation and reflection required, and on the refractive index of transparent films 20 and 26. The structure 15 is designed to have the lowest reflectivity when observed by an observer or observing instrument 29 along the direction of arrow A. The structure's reflectivity when viewed through substrate 28 may be higher.

Detailed examples of layer systems in accordance with the present invention are described below. The examples use titanium nitride for the transition metal nitride component. In Tables 3 through 11, set forth below and describing different structures in accordance with the present invention, the materials designated TiN(1) and TiN(2) have the optical constants n and k listed in Table 1 for 15 nm and 25 nm thick films, respectively.

In all the tables, the substrate is assumed to be glass having a refractive index of about 1.52 at a wavelength of about 510 nm. For all computations, the results illustrated in the figures are transmission and reflection values through a single surface or boundary. In all computations, the layer systems have been optimized to yield the lowest possible reflection in the wavelength range from about 425 nm to about 675 nm, i.e., within the generally accepted limits of the visible spectrum.

Figure 4:
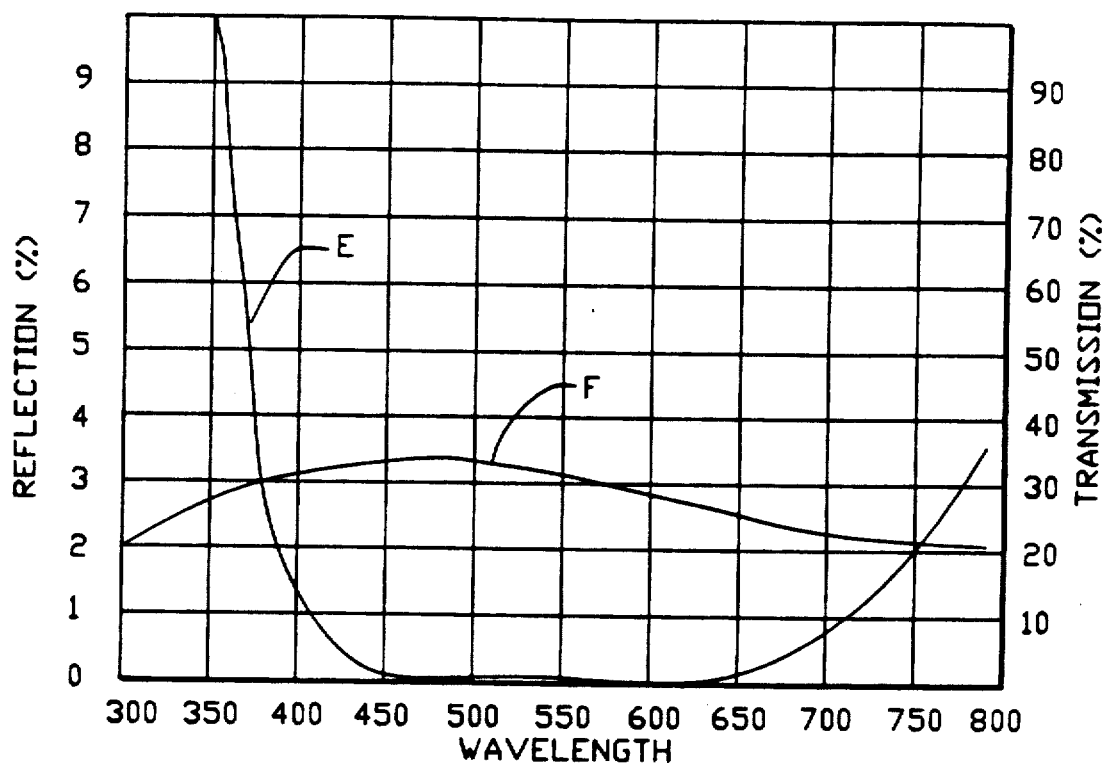
FIG. 4 graphically illustrates the computed reflection and transmission values, as a function of wavelength, for an embodiment of the present invention using silicon dioxide for the first layer, titanium nitride for the second and fourth layers, and tin oxide for the third layer.
Figure 5:
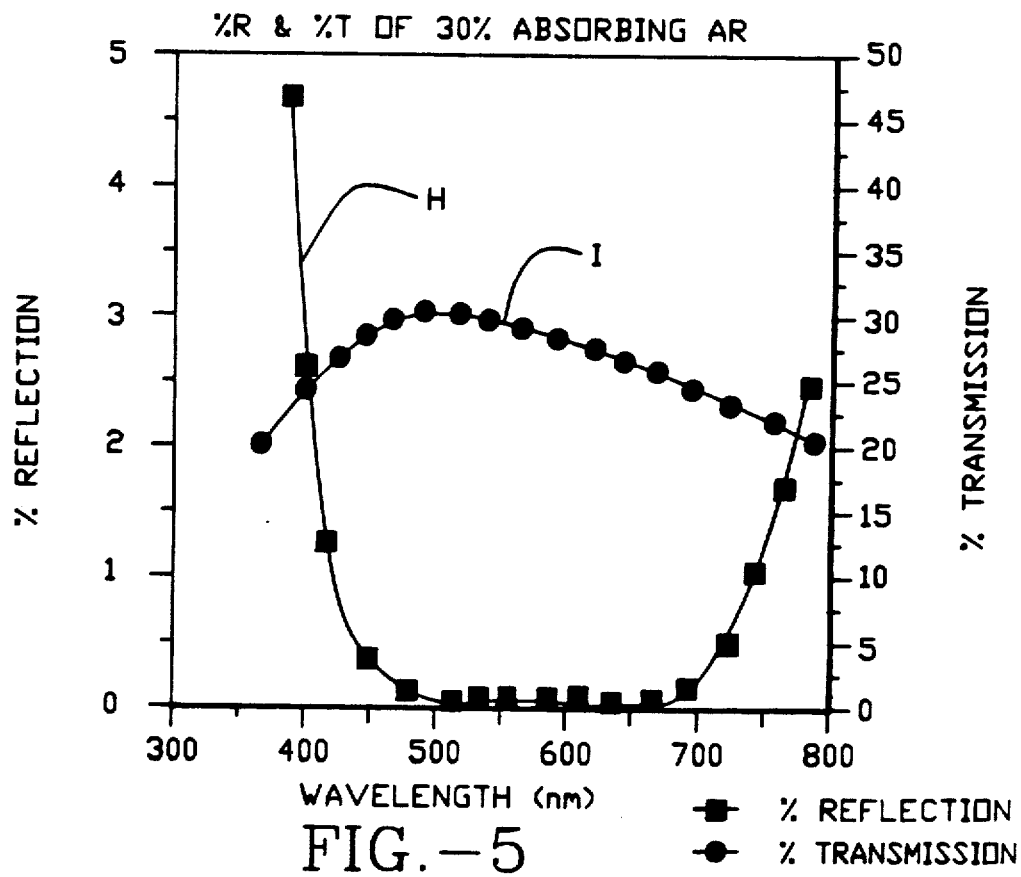
FIG. 5 graphically illustrates the measured reflection and transmission values, as a function of wavelength, for the embodiment referenced in FIG. 4.

A preferred structure 15 may include two titanium nitride (TiN) films 22 and 24, a silicon dioxide ($SiO_2$) film 20, and a tin/oxide ($SnO_2$) film 26. Details of this structure are given in Table 3, and FIG. 4 illustrates the structure's computed reflection (curve E) and transmission (curve F) values. FIG. 5 shows the measured reflection (curve H) and transmission (curve I) values for an actual structure 15 constructed as detailed in Table 3. It can be seen that the structure provides a transmission of about 35 percent, i.e., a light attenuation of about 65 percent. The structure also has a photopic reflectivity of about 0.12 percent, providing superior antireflection properties. This structure also has a sheet resistance of about 66 ohms per square, providing good electrical-conductivity.

TABLE 3

| Layer | Material | Thickness (nm) |
|---|---|---|
|  | Air | Entrance Medium |
| 1 | $SiO_2$ | 75.2 |
| 2 | TiN(1) | 12.7 |
| 3 | $SnO_2$ | 48.4 |
| 4 | TiN(2) | 20.9 |
|  | Glass | Substrate |

As noted above, the nitride film thicknesses of Table 3 were computed using the optical constants for titanium nitride given in Table 1. For the TiN(1) and TiN(2) layers, the values for 15 and 25 nm thick films, respectively, were used. In practice, however, the optical constant values for the 12.7 nm and 20.9 nm films of Table 3 may be slightly different. Furthermore, some differences between the structure's computed and actual optical properties (n, k) may be encountered if the structure is deposited by different sputtering apparatus even though gas mixtures and flow rates may be nominally the same. In practice, such differences may be accommodated for by changing the film thickness. Using a continuous, in-line coating system this may be accomplished within three hours on a trial and error basis.

During deposition, substrates are transported through the machine at a constant speed, i.e. The line speed. The sputtering conditions at each cathode are set to deposit the desired thickness of material during the time the substrate is exposed to the cathode or group of cathodes. Variations in thickness of a few percent may be effected by adjusting the sputtering power.

The relatively simple adjustment from a computed structure to an actual structure is an important feature of the present invention. The adjustment usually involves first an alteration of the thickness of any one of the nitride films to reach the required reflectivity level. The original thickness ratio of the nitride films is maintained during the adjustment. The antireflection region is restored to the desired wavelength range by adjusting the thickness of third film 26, i.e., the transparent film between the nitride films 22 and 24. The thickness of the third film is usually adjusted in the opposite sense to the nitride films.

It has also been determined that the computed structures may have a range of different thickness values which will give optimum low reflection results. The differences between two such structures may be seen as different values of transmission. It is believed that this property of the structure of the present invention may be a reason why the actual optimizations are relatively simple.

Agreement between the computed values of FIG. 3 and the measured result of FIG. 4 is good. The differences at any given wavelength may be accounted for primarily by the wavelength displacement of the curves. The measured curve H is displaced by about 2 to 3 percent to longer wavelengths when compared with the computed curve E.

Samples of the structure of Table 3 have withstood boiling in a five percent solution of sodium chloride (NaCl) for one hour. The structure also showed no damage when subjected to fifty rubs of the standard abrasion test of MIL-C-675A. Thus, the structure demonstrated corrosion and abrasion resistance.

Figure 6:
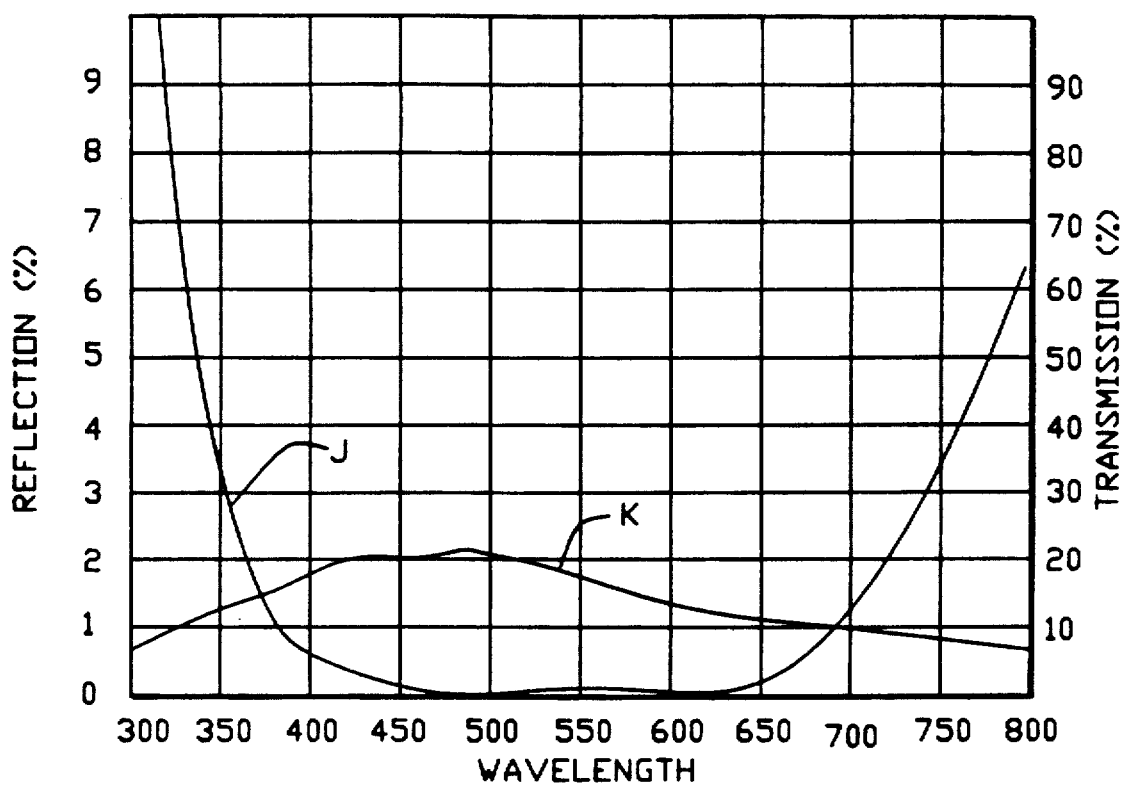
FIG. 6 graphically illustrates the computed reflection and transmission values, as a function of wavelength, for an embodiment of the present invention using alternate optical constants for a titanium nitride film.

A layer system was computed using the optical values of titanium nitride given in a paper by Szczyrbowski et al., "Optical and Electrical Properties of Thin TiN-Layers", *Vakuum Technik*, 37, 14–18 (1988). This structure is shown in Table 4. TiN(3) represents the Szczyrbowski values and TiN(1) the optical constant values for the 15 nm thick film of Table 1. The reflection (curve J) and transmission (curve K) values for this structure are shown in FIG. 6.

TABLE 4

| Layer | Material | Thickness (nm) |
|---|---|---|
|  | Air | Entrance Medium |
| 1 | SiO$_2$ | 65.2 |
| 2 | TiN(1) | 16.1 |
| 3 | SnO$_2$ | 42.4 |
| 4 | TiN(3) | 36.6 |
|  | Glass | Substrate |

The structure of Table 4 may have a photopic reflectivity of about 0.1 percent. The structure of Table 4 demonstrates that the present invention is not limited to the specific optical constants of Table 1.

In the context of the present invention, layer 26 (See FIG. 3) may have a refractive index value from between about 1.35 and 2.65. Although certain values may be preferable, i.e., those between 1.9 and 2.35, all values may provide acceptable low reflection. Different refractive indices for layer 26 may be compensated for by different thicknesses of layers 22 and 24 to provide optimum reflection reduction. For any given refractive index, more than one combination of layer thicknesses may give a low reflection. The difference in the combination may also result in different transmission values. This mechanism may be used to produce a desired value of light attenuation for the structure. The examples below serve to illustrate this principle.

Figure 7:
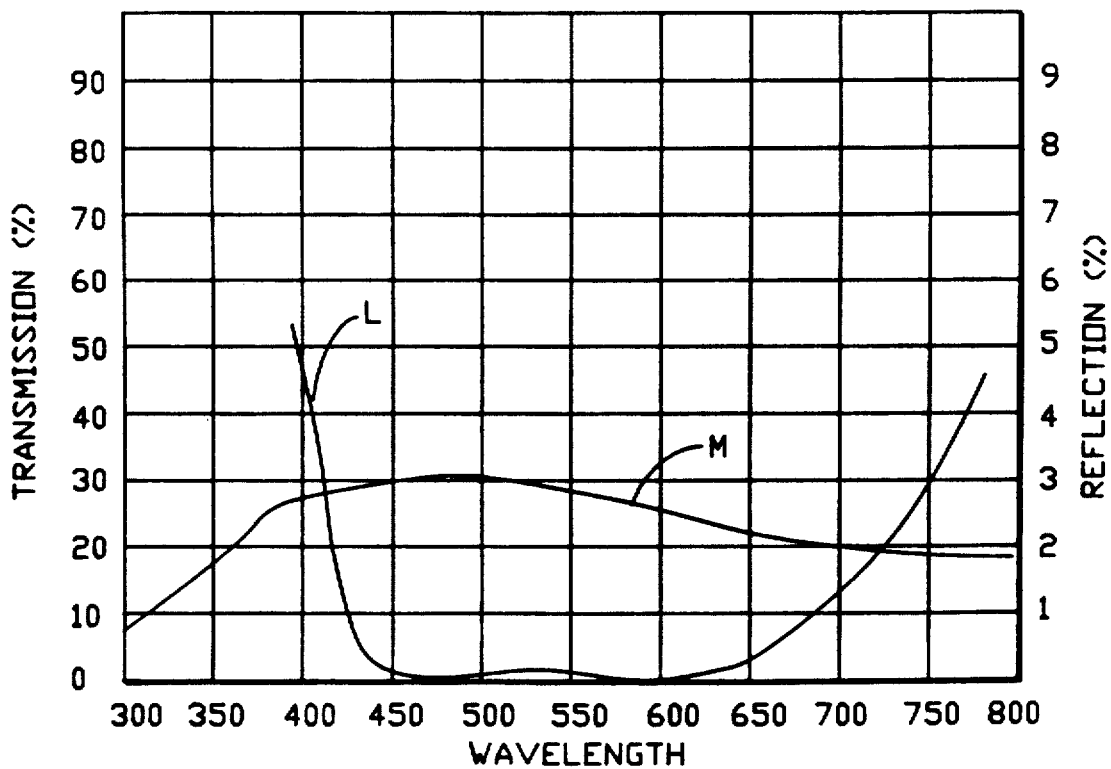
FIG. 7 graphically illustrates the computed reflection and transmission values, as a function of wavelength, for an embodiment of the present invention using silicon dioxide for the first layer, titanium nitride for the second and fourth layers, and titanium dioxide for the third layer.

Table 5 shows the details of another embodiment of the present invention. The computed reflection (curve L) and transmission (curve M) values are shown in FIG. 7. In this embodiment, titanium dioxide (TiO$_2$) having a refractive index of about 2.35 at a wavelength of about 510 nm has been used for film 26.

TABLE 5

| Layer | Material | Thickness (nm) |
|---|---|---|
|  | Air | Entrance Medium |
| 1 | SiO$_2$ | 80.0 |
| 2 | TiN(1) | 11.3 |
| 3 | TiO$_2$ | 33.0 |
| 4 | TiN(2) | 29.8 |
|  | Glass | Substrate |

The structure of Table 5 may have a computed photopic reflectivity of about 0.16 and photopic transmission of about 30 percent. It can be seen that the total thickness of the titanium nitride layers is about 41 nm. In the embodiment of Table 3, the total thickness of titanium nitride is about 34 nm and the photopic transmission is about 35 percent. The additional titanium nitride material in the embodiment of Table 5 provides greater attenuation of visible light. This can be seen by comparing the transmission values of FIG. 4 to those of FIG. 7.

Table 6 shows the details of another embodiment of the present invention wherein the nitride layers are thinner.

TABLE 6

| Layer | Material | Thickness (nm) |
|---|---|---|
|  | Air | Entrance Medium |
| 1 | SiO$_2$ | 82.2 |
| 2 | TiN(1) | 6.7 |
| 3 | TiO$_2$ | 30.0 |
| 4 | TiN(2) | 19.9 |
|  | Glass | Substrate |

Figure 8:
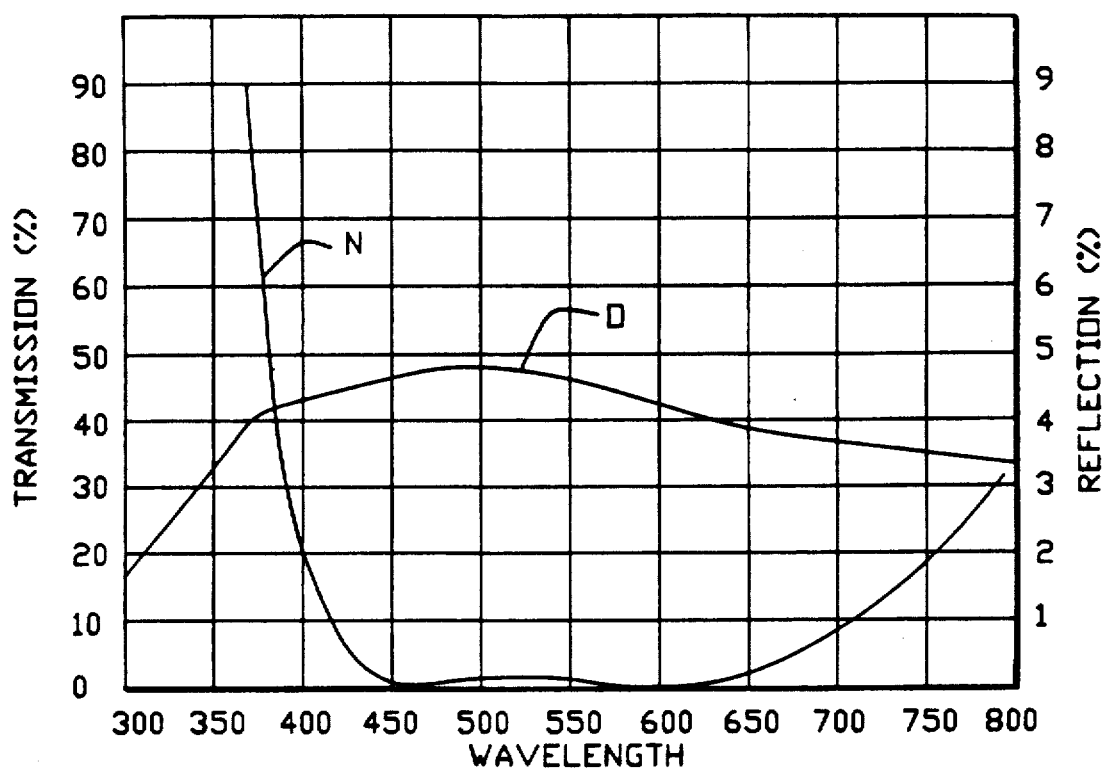
FIG. 8 graphically illustrates the computed reflection and transmission values, as a function of wavelength, for an embodiment reference in FIG. 7 but using thinner films of titanium nitride.
Figure 9:
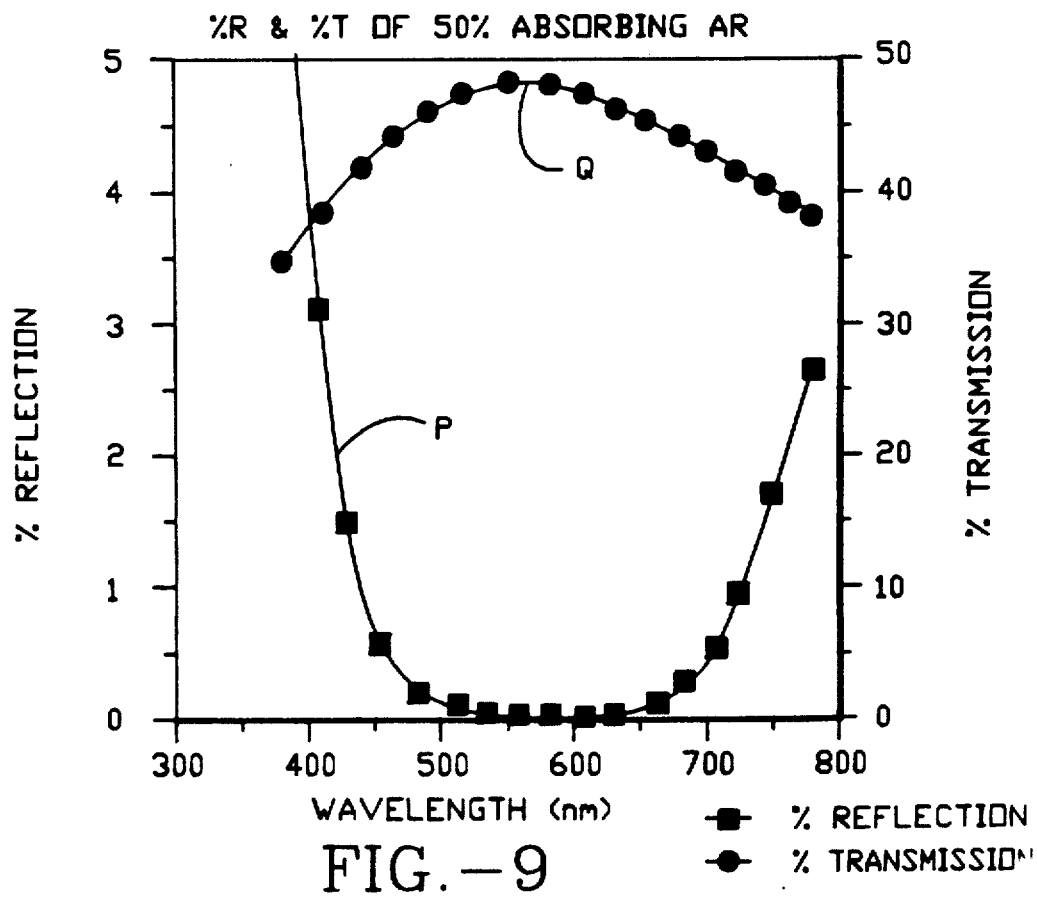
FIG. 9 graphically illustrates the computed reflection and transmission values, as a function of wavelength, for an embodiment referenced in FIG. 8.

This structure has a computed photopic reflection of about 0.08 percent, and a computed photopic transmission of about 48 percent. The computed values of reflection (curve N) and transmission (curve O) are shown in FIG. 8. The measured reflection (curve P) and transmission (curve Q) values of the structure of Table 6 are shown in FIG. 9. As can be seen from these curves, the structure of Table 6 provides high transmission while providing low reflection. The electrical-conductivity of the structure of Table 6 would be lower than that of Table 5, but would still be adequate for preventing a build-up of static charges. Table 7 shows the details of yet another embodiment of the present invention. The computed reflection (curve R) and transmission (curve S) values are shown in FIG. 10. Silicon dioxide (SiO$_2$)

having a refractive index of about 1.46 at a wavelength of about 510 nm has been used to form layer 26.

TABLE 7

| Layer | Material | Thickness (nm) |
|---|---|---|
|  | Air | Entrance Medium |
| 1 | SiO$_2$ | 75.1 |
| 2 | TiN(1) | 21.0 |
| 3 | SiO$_2$ | 74.1 |
| 4 | TiN(2) | 30.5 |
|  | Glass | Substrate |

The photopic reflectivity of the structure may be about 0.2 percent. The total thickness of the titanium nitride layers is about 51 nm giving a photopic transmission of about 15 percent. Comparing the structure of Table 7 with the structure of Table 5 it can be seen that materials with substantially different refractive indices may be used for the third film while still achieving a very low reflection value.

Generally, the lower the refractive index of outer film 20, the lower will be the reflection from the system. The refractive index of layer 20 may be as low as 1.35, although materials having such a low value may not be sufficiently durable to be practical. If the refractive index of film 20 is greater than about 1.46, the range of refractive index values possible for film 26 becomes narrower. Specifically, only relatively high refractive index films may yield a photopic reflectivity of about one-quarter of one percent or less. By way of example, Table 8 shows the construction of a system wherein outer film 20 is aluminum oxide (AL$_2$O$_3$). Aluminum oxide films may have a refractive index of about 1.65 at a wavelength of about 510 nm. Film 26 is tin oxide which may have a refractive index of about 1.92 at a wavelength of about nm. The photopic reflectivity of the structure may be about 0.49 percent.

TABLE 8

| Layer | Material | Thickness (nm) |
|---|---|---|
|  | Air | Entrance Medium |
| 1 | Al$_2$O$_3$ | 50.9 |
| 2 | TiN(1) | 22.5 |
| 3 | SnO$_2$ | 44.0 |
| 4 | TiN(2) | 28.0 |
|  | Glass | Substrate |

Table 9 lists the details of a layer system or structure wherein outer film 20 is aluminum oxide and film 26 is titanium dioxide, which may have a refractive index of about 2.35 at a wavelength of about nm. The photopic reflectivity of this system is about 0.3 percent.

TABLE 9

| Layer | Material | Thickness (nm) |
|---|---|---|
|  | Air | Entrance Medium |
| 1 | Al$_2$O$_3$ | 50.9 |
| 2 | TiN(1) | 22.5 |
| 3 | TiO$_2$ | 44.0 |
| 4 | TiN(2) | 28.0 |
|  | Glass | Substrate |

FIG. 11 shows the computed reflection values (curve U and curve T) for the structures of Tables 8 and 9, respectively.

It should be evident from the above examples that a practical upper limit for the refractive index of first layer 20 is determined by the availability of transparent materials having a sufficiently high refractive index. Practically, the highest refractive index for a material which is substantially transparent to visible light may be about 2.65, which is about the refractive index of the rutile crystalline form of titanium dioxide.

A structure including titanium nitride films 22 and 24, an outer film 20, having a refractive index of about 1.9, and a film 26, having a refractive index of about 2.65, may have a reflectivity of about 0.75 percent or less. A reflectivity of 0.75 percent may be acceptable for certain applications such as for sunglasses.

Figure 12:
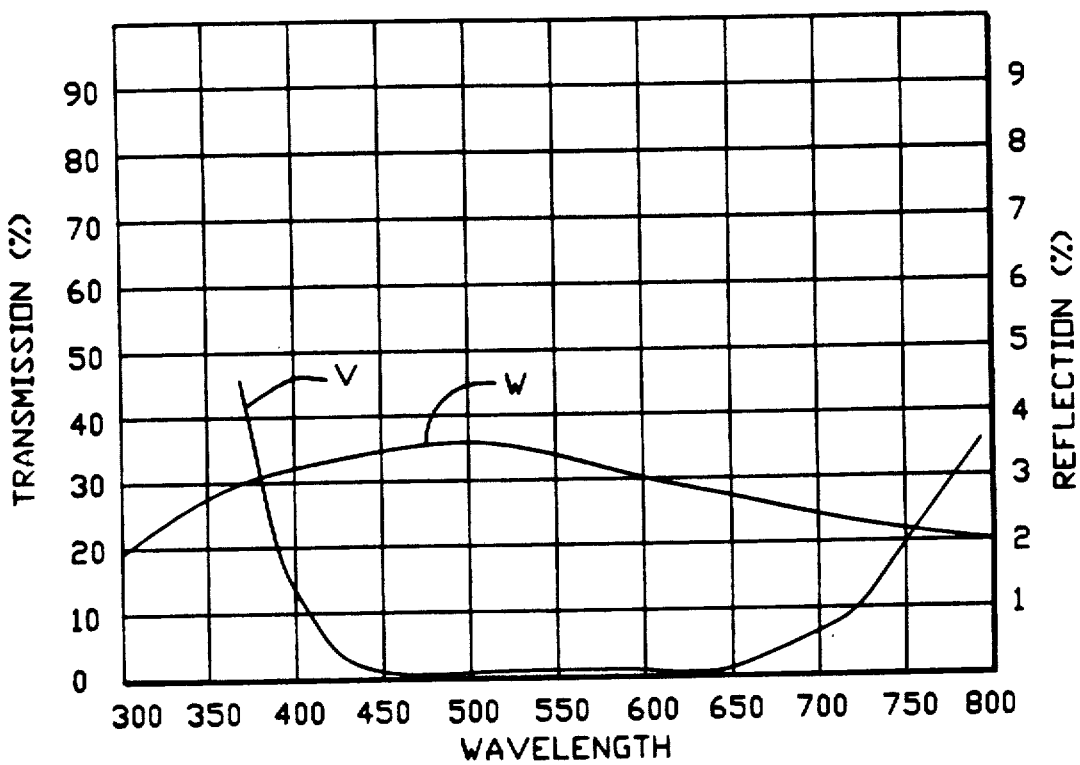
FIG. 12 graphically illustrates the computed reflection and transmission values, as a function of wavelength, for a five layer system of the present invention using silicon dioxide for the first layer, titanium nitride for the second and fourth layers, tin oxide for the third layer, and tin oxide for the fifth layer.

Other embodiments of the present invention may comprise more than four layers. For example, a fifth film may be added between titanium nitride film 24 and substrate 28. The details of such a structure are shown in Table 10. The reflection (curve V) and transmission (curve W) values for this structure are shown in FIG. 12.

TABLE 10

| Layer | Material | Thickness (nm) |
|---|---|---|
|  | Air | Entrance Medium |
| 1 | SiO$_2$ | 75.2 |
| 2 | TiN(1) | 12.4 |
| 3 | SnO$_2$ | 49.6 |
| 4 | TiN(2) | 21.7 |
| 5 | SnO2 | 9.8 |
|  | Glass | Substrate |

The structure of Table 10 may be compared with the structure of Table 3 as the materials of the first four layers in each structure are the same. As can be seen, the additional layer of tin oxide (SnO$_2$) is accommodated for by increasing the thickness of the titanium nitride layers and reducing the thickness of the tin oxide layer therebetween.

Comparing the curves of FIG. 12 with those of FIG. 4 illustrates that the addition of the fifth layer may not yield a significant improvement in antireflection performance or a significant difference in the attenuation of visible light. Variations of the above-described five layer structure wherein the refractive index of the fifth layer was varied from 1.35 to 2.65 at a wavelength of about 510 nm have been investigated. It has been determined that for all values of refractive index, a layer thickness sequence may be established which may yield a photopic reflectivity of about 0.25 percent. For all values of refractive index, the thickness of the fifth layer was less than one-eighth wavelength in the wavelength range from about 480 nm to 560 nm.

Figure 13:
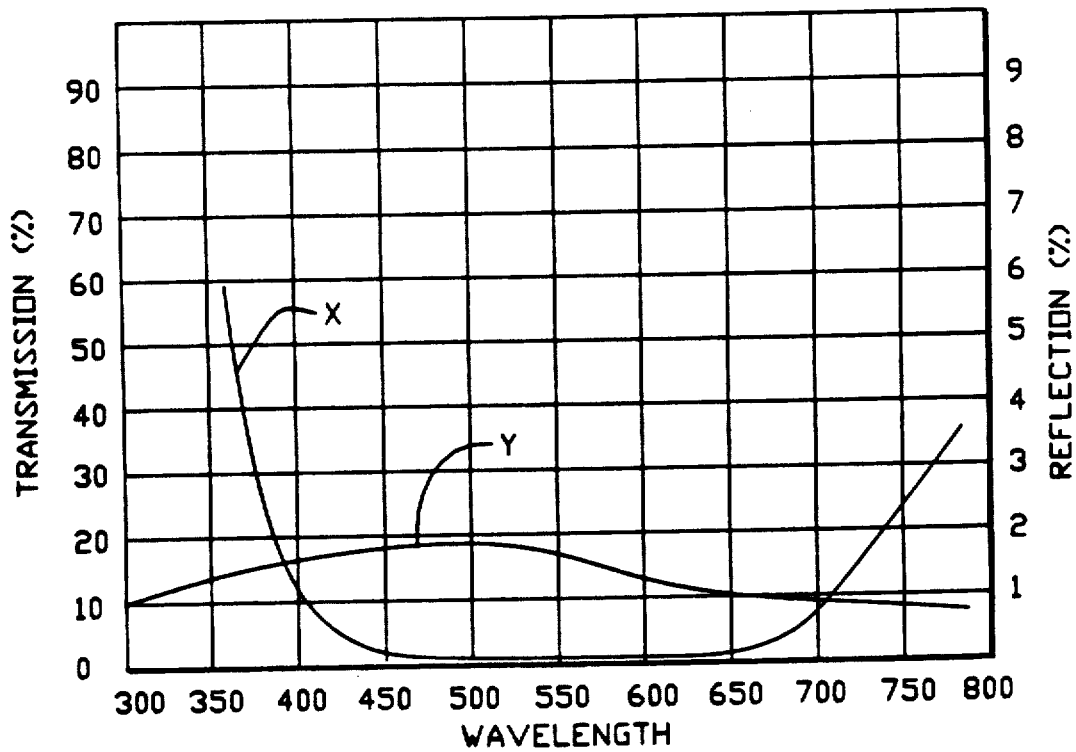
FIG. 13 graphically illustrates the computed reflection and transmission values, as a function of wavelength, for a six layer system of the present invention using silicon dioxide for the first layer, titanium nitride for the second, fourth and sixth layers, and tin oxide for the third and fifth layers.

Another embodiment of the present invention comprises six layers. This embodiment includes three transition metal nitride layers separated by a film of material substantially transparent to visible light. The layer system of such a structure is illustrated by reference to Table 11. The structure's reflection (curve X) and transmission (curve Y) values are shown in FIG. 13.

TABLE 11

| Layer | Material | Thickness (nm) |
|---|---|---|
|  | Air | Entrance Medium |
| 1 | SiO$_2$ | 75.1 |
| 2 | TiN(1) | 14.5 |
| 3 | SnO$_2$ | 49.2 |
| 4 | TiN(2) | 23.6 |
| 5 | SnO$_2$ | 38.2 |
| 6 | TiN(1) | 7.9 |
|  | Glass | Substrate |

The structure of Table 11 may have a photopic reflectivity of about 0.1 percent. The reflectivity is not significantly lower than the four film structure of Table 3. The additional titanium nitride layer, however, provides a photopic transmission of about 17 percent compared with about 35 percent for the four film structures.

In any of the above-described embodiments, it may be possible to replace one or more transparent materials with a combination of thinner layers, i.e. sub-layers, having about the same total optical thickness but different refractive indices. This technique is well known in the art as a way of simulating a layer of material having a specific refractive index. The technique may be used when a material having some desired value of refractive index does not exist, is not easily deposited, or does not have suitable physical properties. Such modifications are possible without departing from the spirit and scope of the present invention.

The reflectivity values given for the above-described embodiments are the values observed from the side of the structures farthest from the substrate. It is well known that structures including light absorbing films may have different reflection values on different sides of the structure.

A structure including titanium nitride, or another transition metal nitride, may be designed to reduce reflection as observed from the substrate side of a coated article or device. Such a structure may require only two layers, one of which is a nitride layer, to provide a very low photopic reflection.

Figure 14:
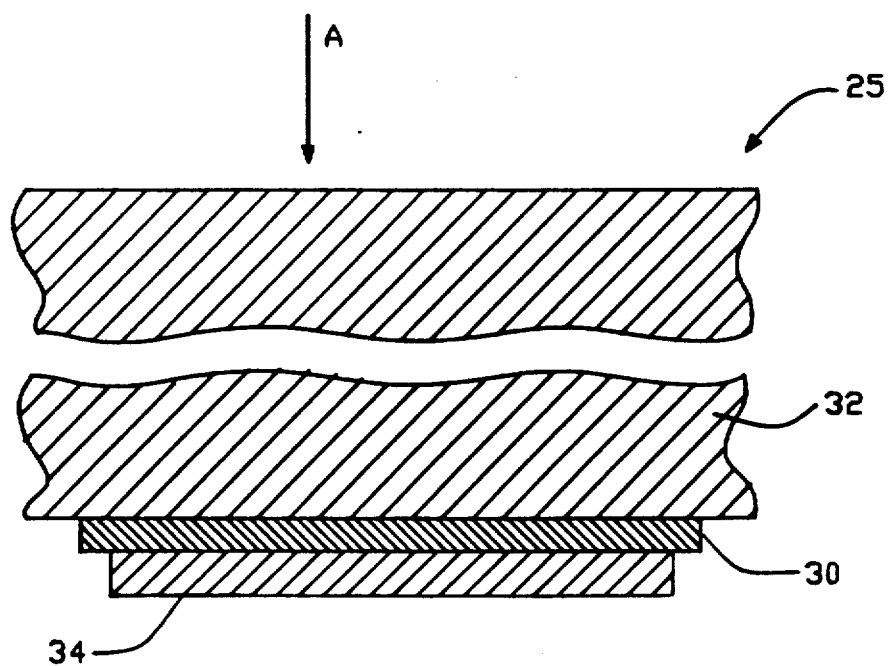
FIG. 14 schematically illustrates a two layer system in accordance with the present invention.

Such an embodiment of the present invention is shown in FIG. 14. The structure 25 includes a thin film of nitride 30 deposited on a substrate 32. A film 34 of a material substantially transparent to visible light is deposited on nitride film 30. The film thicknesses are adjusted to provide the lowest reflectivity for visible light as observed in the direction of arrow A. The nitride layer 30 may be between about 6 and 9 nm thick. Preferably, it is about 8 nm thick. The transparent layer is between about 2 and 15 nm thick, depending on the refractive index of the transparent material. The refractive index of this layer is between about 1.35 and 2.65 at a wavelength of about 510 nm.

Layer 30 may be titanium nitride, and layer 34 may be silicon dioxide, tin oxide or titanium dioxide. The optical constants of titanium nitride can be those shown in Table 1 for a 15 nm thick film. The thickness of layer 34 can be about 2.5 nm for titanium dioxide having a refractive index of about 2.35 at a wavelength of about 510, nm and about 10.8 nm for silicon dioxide having a refractive index of about 1.46 at a wavelength of about 510 nm.

FIG. 15 shows the computed reflectivity of a titanium nitride film (curve Z), and of a titanium nitride film overcoated with silicon dioxide (curve AA), tin oxide (curve BB), or titanium dioxide (curve CC). The reflectivity values in FIG. 15 are shown on a scale of 0 to 1 percent to highlight the difference in reflection obtained with different overcoating materials. As can be seen, the reflection value is very low for a wide range of refractive indices of different overcoatings or layers 34. Any refractive index in the range from about 1.35 to about 2.65 at a wavelength of about 510 nm may be used to produce an effective coating.

FIG. 16 shows the measured reflection (curve DD) and transmission (curve EE) values for a single film of titanium nitride about 80 nm thick on a glass substrate (n=1.52). The figure includes the reflection from an uncoated surface of the substrate (curve FF). The measured reflection curve DD (FIG. 16) may be compared with the computed curve Z (FIG. 15). The measured curve DD shows a minimum value more or less the same as the computed curve Z. The minimum value of the measured curve occurs at a larger wavelength than the computed curve. The measured data is for the reflection as viewed through the substrate.

In the above-described embodiments, titanium nitride was used as the transition metal nitride. It will be apparent, however, that any of the transition metal nitrides may be used in the structure of the present invention. For example, other transition metal nitrides may be useful to provide different levels of transmission or different values of sheet resistance. It may also be useful to use two or more different transition metal nitrides in a structure.

In the above-described embodiments, metal oxides have been used as the transparent materials. It will be apparent, however, that other materials may be used, for example a substantially-transparent nitride, such as silicon nitride, or an oxynitride, such as silicon oxynitride. Materials such as fluorides and sulfides may also be used although they may not be easily deposited by reactive sputtering.

The coating of the present invention may be used to construct contrast enhancement filters. Such filters are most effective if they have antireflection coatings on both surfaces. The light attenuating, antireflection coating may be applied to one surface only. The other surface may receive another type of antireflection coating. This other coating may be the two layer embodiment of the present invention shown in FIG. 14 or a single film of titanium nitride.

As is shown in FIG. 17, a contrast enhancement filter 50 may be disposed in front of a VDT screen 52. The filter 50 includes a transparent substrate 40 coated on its surface 42 with the four-layer structure 15 of Table 3. The surface 46 of substrate 40 may be coated with the two-layer structure 25. Structure 25 may include a layer of titanium nitride about 7.8 nm thick.

The low reflection sides of coatings 15 and 25 face an observer or operator 54. The direction of observation is indicated by arrow A. The light attenuating property of filter 50 causes the suppression of reflection 56 from screen 52.

FIG. 18 shows the measured transmission (Curve GG) and reflection (curve HH) values of contrast enhancement filter 50. The reflection measurement was taken in the direction of arrow A. Surfaces 40 and 46 have a sheet resistance of about 150 and 250 ohms per square, respectively. As such, if surface 40 is electrically grounded, the build-up of static charges will be prevented.

A contrast enhancement filter is but one application of the present invention. It will be apparent from the embodiments described that the present invention may be used in other applications, including solar control glazings, sunglasses and protective eyewear. Embodiments of the present invention may be used on one or both surfaces of an article or device. Embodiments of the present invention may be used on one surface of an article having another type of thin film interference coating on the opposite surface. Embodiments of the present invention may also be used on one surface of an article having an antireflection treatment, such as a chemical etch, on the opposite surface. The choice of coating combinations is determined by the specific requirements of the article.

The materials used to construct the above-described embodiments may also be, and have been, deposited in commercially-available machines, using commercially available sputtering cathodes. The materials may also be deposited in a continuous, in-line sputtering or other machine. The materials may be deposited by DC reactive sputtering or other process. The optical properties of the films, however, as already noted, may be different and the differences must be considered in determining suitable film thickness.

The machine used to deposit the structure or coatings of Tables 3 and 6, and of FIGS. 14 and 17 was an in-line sputter coating machine. The machine includes five separate chambers separated by vacuum locks. Each chamber may contain up to 3 sputtering cathodes which may be planar magnetrons or rotating cylindrical magnetrons. The apparatus will accept substrates up to two meters long by one meter wide. In the above described embodiments, the titanium nitride films were deposited using planar magnetrons. The silicon dioxide and tin oxide films were deposited using rotating cylindrical magnetrons.

The above-described, in-line sputtering machine is a modified D1 model coater supplied by Airco Coating Technologies Inc. of Fairfield, Calif. Modifications to the machine include: replacement of the original Edwards oil diffusion pumps with Varian (Palo Alto, Calif.) Model 185 oil diffusion pumps to provide a two fold increase in pumping capacity; the addition of a separate pump aperture over the vacuum lock tunnels to reduce pressure fluctuations during substrate passage through the vacuum locks; and the replacement of the original plastic gas inlet tubes with stainless steel tubes. The rotating magnetrons were equipped with an arc suppression structure and shielding as described in copending application Ser. No. 07/565,921, filed Aug. 10, 1990, entitled "Shielding for Arc Suppression in Rotating Magnetron Sputtering Systems", Dickey et al; and copending application Ser. No. 07/566,214, filed Aug. 10, 1990, entitled "Cantilever Mount For Rotating Cylindrical Magnetrons", Stevenson et al; both applications are to be assigned to the intended assignee of the present application; and the entire disclosures of these two applications are hereby incorporated by reference. The rotating magnetrons may also be equipped with electron arc diverters available from Airco Coating Technologies, Inc., Fairfield, Calif.

The present invention has been described in terms of a number of embodiments. The invention however is not limited to the embodiments depicted and described. Rather the scope of the invention is defined by the appended claims.

What is claimed is:

1. A coating for an article, comprising:
a group of three layers wherein two of said layers substantially include a transition metal nitride, each of said two layers having a thickness between about 5 nm and 40 nm, and a third layer between said two layers, said third layer including a material substantially transparent to visible light, and having an optical thickness less than or equal to about one-quarter wavelength at a wavelength between about 480 nm and 560 nm and a refractive index between about 1.35 and about 2.65 at a wavelength of about 510 nm; and fourth layer adjoining said three layer group on the side thereof farthest from the article, said fourth layer including a material substantially transparent to visible light and having a refractive index between about 1.35 and 1.9 at a wavelength of 510 nm and an optical thickness of about one-quarter wavelength between about 480 nm and about 560 nm.

2. The coating of claim 1 wherein said transition metal nitride layers comprise a material selected from the group consisting of titanium nitride, zirconium nitride, hafnium nitride, vanadium nitride, niobium nitride, tantalum nitride and chromium nitride.

3. The coating of claim 1 wherein said twolayers comprise titanium nitride.

4. The coating of claim 1 further including a fifth layer of a material substantially transparent to visible light, said fifth layer having a refractive index between about 1.35 to about 2.65 and an optical thickness less than one-eighth wavelength at a wavelength in the range from about 480 nm and 560 nm and said fifth layer adjoining said three layer group on the side thereof closest to the article.

5. The coating of claim 1 wherein at least one layer of material substantially transparent to visible light comprises at least two sublayers having different refractive indices.

6. An electrically conductive, reflection reducing coating for a substrate, comprising:
a group of five layers wherein three of said layers substantially include a transition metal nitride having a thickness between about 5 nanometer and 40 nanometer, and said three layers being arranged alternately with two other layers of said five layer group, said two other layers including a material substantially transparent to visible light and having an optical thickness less than or equal to about one-quarter wavelength at a wavelength in the range from about 480 nm to 560 nm and a refractive index between about 1.35 and 2.65 at a wavelength of about 510 nm; and an additional layer adjoining said five layer group on the side thereof farthest from the substrate, said additional layer including a material substantially transparent to visible light, and having a refractive index between about 1.35 and 1.9 at a wavelength of about 510 nm and an optical thickness of about one-quarter wavelength between about 480 nm and 560 nanometers.

7. The coating of claim 6 wherein said transition metal nitride layers comprise a material selected from the group consisting of titanium nitride, zirconium nitride, hafnium nitride, vanadium nitride, niobium nitride, tantalum nitride and chromium nitride.

8. The coating of claim 6 wherein said transition metal nitride layers comprise titanium nitride.

9. The coating of claim 6 further including a seventh layer of a material substantially transparent to visible light, said seventh layer having a refractive index in the range from about 1.35 to about 2.65 and an optical thickness less than one-eighth wavelength at a wavelength in the range from about 480 nm to 560 nm and said seventh layer adjoining said five layer group on the side thereof closest to said substrate.

10. The coating of claim 6 wherein at least one layer of material substantially transparent to visible light comprises at least two sublayers having different refractive indices.

11. A coating for a substrate, comprising: a first layer substantially including a transition metal nitride and having a thickness between about 6 nm; and 9 nm, and a second layer adjacent to said first layer, said second layer including a material substantially transparent to visible light, having a refractive index between about 1.35 and 2.65 at a wavelength of about 510 nm, and a thickness between about 2 nm to 15 nm.

12. The coating of claim 11 wherein said first layer comprises a material selected from the group consisting of titanium nitride, zirconium nitride, hafnium nitride, vanadium nitride, niobium nitride, tantalum nitride and chromium nitride.

13. The coating of claim 11 wherein said first comprises substantially titanium nitride.

14. An electrically conductive, reflection reducing coating for an article, comprising:
a group of three layers wherein two of said layers substantially include titanium nitride, each of said two layers having a thickness between about 5 nm and about 40 nm, and a third layer between said two layers, said third layer including a metal oxide having an optical thickness less than or equal to about one quarter wavelength at a wavelength between about 480 nm and 560 nm and a refractive index between about 1.35 and 2.65 at a wavelength of about 510 nm; and a fourth layer adjoining said three layer group on the side thereof farthest from the article, said fourth layer including a metal oxide having a refractive index between about 1.35 and 1.9 at a wavelength of about 510 nm and an optical thickness of about one-quarter wavelength between about 480 nm to 560 nm.

15. The coating of claim 14 further including a fifth layer of a metal oxide, said layer having a refractive index between about 1.35 and 2.65 and an optical thickness less than one eighth of wavelength between about 480 nm to 560 nm and said fifth layer adjoining said three layer group on the side thereof closest to the article.

16. The coating of claim 14 or 15 wherein at least one layer of metal oxide comprises at least two sublayers having different refractive indices.

17. An electrically conductive, reflection reducing coating for a substrate, comprising:
a group of five adjoining layers wherein three of said layers substantially include titanium nitride having a thickness between about 5 nm and 40 nm, said three layers being arranged alternately with two other layers of a metal oxide having an optical thickness less than or equal to about one-quarter wavelength at a wavelength between about 480 nm and 560 nm and a refractive index between about 1.35 and 2.65 at a wavelength of about 510 nm; and a sixth layer adjoining said five layer group on the side thereof farthest from the substrate, said sixth layer including a metal oxide having a refractive index in the range from about 1.35 to about 1.9 at a wavelength of about 510 nm and an optical thickness of about one-quarter wavelength at a wavelength between about 480 nm to 560 nm.

18. The coating of claim 17 further including a seventh layer of a metal oxide, said layer having a refractive index in the range from about 1.35 to about 2.65 and an optical thickness less than one eighth wavelength at a wavelength in the range from about 480 nm to 560 nm and said layer adjoining said five layer group on the side thereof closest to said substrate.

19. The coating of claim 17 or 18 wherein at least one layer of metal oxide comprises at least two sublayers having different refractive indices.

20. A coating for an article, comprising:
a first layer comprising a material substantially transparent to visible light and having a refractive index between about 1.35 and 1.9, and an optical thickness of about one-quarter wavelength at a wavelength between about 480 nm and about 560 nm, said first layer being the outermost layer of said coating; adjoining said first layer a second layer comprising substantially a transition metal nitride and having a thickness between about 5 nm and 40 nm; a third layer adjoining said second layer and comprising a material substantially transparent to visible light and having a refractive index between about 1.35 and 2.65 and an optical thickness less than or equal to about one-quarter wavelength between about 480 nm and 560 nm; and adjoining said third layer a fourth layer comprising substantially a transition metal nitride having a thickness between about 5 nm and 40 nm.

21. The coating of claim 20 wherein said transition metal nitride layers comprise substantially a material selected from the group consisting of titanium nitride, zirconium nitride, hafnium nitride, vanadium nitride, niobium nitride, tantalum nitride and chromium nitride.

22. The coating of claim 20 wherein said transition metal nitride layers comprise substantially titanium nitride.

23. The coating of claim 20 further including a fifth layer of a material substantially transparent to visible light, said layer having a refractive index between about 1.35 to about 2.65 and an optical thickness less than one eighth wavelength at a wavelength between about 480 nm and 560 nm and said layer adjoining said fifth layer adjoining said fourth layer.

24. The coating of claim 20 wherein at least one layer of material substantially transparent to visible light comprises at least two sublayers having different refractive indices.

25. A reflection reducing light attenuating coating for an article, comprising:
a first layer including a material substantially transparent to visible light and having a refractive index between about 1.35 and 1.9 and an optical thickness of about one quarter wavelength a between about 480 nm and about 560 nm, said first layer being the outermost layer of said coating; a second layer including substantially a transition metal nitride and having a thickness between about 5 nm and 40 nm; a third layer including a material substantially transparent to visible light and having a refractive index between about 1.35 and about 2.65 and an optical thickness less than or equal to about one-quarter wavelength between about 480 nm and about 560 nm; a fourth layer including substantially a transition metal nitride and having a thickness between about 5 nm and 40 nm; a fifth layer including a material substantially transparent to visible light and having a refractive index between about 1.35 and about 2.65 and an optical thickness less than or equal to about one-quarter wavelength between about 480 nm and about 560 nm; a sixth layer including substantially a transition metal nitride and having a thickness between about 5 nm and 40 nm.

26. The coating of claim 25 wherein said transition metal nitride layers comprise substantially a material selected from the group consisting of titanium nitride, zirconium nitride, hafnium nitride, vanadium nitride, niobium nitride, tantalum nitride and chromium nitride.

27. The coating of claim 25 wherein said transition metal nitride layers comprise substantially titanium nitride.

28. The coating of claim 25 wherein at least one layer of material substantially transparent to visible light comprises at least two sublayers having different refractive indices.

29. A coated article, comprising:
a transparent substrate; and
on one surface of said substrate, a coating including a first layer including a material substantially transparent to visible light and having a refractive index between about 1.35 and 1.9 and an optical thickness of about one-quarter wavelength at some wavelength between 480 nm and 560 nm, said first layer being the outermost layer of said coating, a second layer including substantially a transition metal nitride having a thickness between about 5 nm to 40 nm; adjoining said second layer a third layer including a material substantially transparent to visible light and having a refractive index in the range from about 1.35 to about 2.65 and an optical thickness less than or equal to about one-quarter wavelength at a wavelength between about 480 nm to about 560 nm, a fourth layer including substantially a transition metal nitride and having a thickness in the range from about 5 nm to 40 nm.

30. The article of claim 29 wherein said antireflection coating further includes a fifth layer comprising a material substantially transparent to visible light and having a refractive index between about 1.35 and about 2.65 and an optical thickness less than one eighth wavelength at a wavelength between about 480 nm and about 560 nm, said fifth layer being located between said fourth layer and said substrate.

31. The article of claim 29 further wherein said antireflection coating further includes: a fifth film, adjacent said fourth film, comprising a material substantially transparent to visible light and having a refractive index between about 1.35 and about 2.65 and an optical thickness less than or equal to about one quarter wavelength at a wavelength in the range from about 480 nm to 560 nm; and a sixth film, adjacent said fifth film, said sixth film including substantially a transition metal nitride and having a thickness between about 5 nm and 40 nm.

32. The article of claim 29, 30, or 31 further including an antireflection treatment on the surface of said substrate opposite said conductive light attenuating coating.

33. The article of claim 32 wherein said antireflection treatment is a multilayer antireflection coating.

34. The article of claim 33 wherein said multilayer antireflection coating includes a layer adjoining said substrate comprising substantially a transition metal nitride and having a thickness between about 5 nm and 15 nm, and adjoining said nitride layer, a layer of a material substantially transparent to visible light and having a refractive index between about 1.35 and 2.65 and a thickness between about 2 nm and 15 nm.

* * * * *

UNITED STATES PATENT AND TRADEMARK OFFICE
CERTIFICATE OF CORRECTION

PATENT NO. : 5,091,244
DATED : February 25, 1992
INVENTOR(S) : Erik J. Bjornard

It is certified that error appears in the above-identified patent and that said Letters Patent is hereby corrected as shown below:

ON THE TITLE PAGE: Item [75] should read "Bjornard".

Column 16, line 8, "twolayers" should read --two layers--.

Column 17, lines 8-9, insert the word "layer" between --first-- and --comprises--.

Signed and Sealed this

Eleventh Day of May, 1993

Attest:

MICHAEL K. KIRK

Attesting Officer

Acting Commissioner of Patents and Trademarks